(12) United States Patent
Kotay et al.

(10) Patent No.: US 8,959,660 B2
(45) Date of Patent: Feb. 17, 2015

(54) MANAGED SERVICES ENVIRONMENT PORTABILITY

(75) Inventors: Sree Kotay, Philadelphia, PA (US); Anthony Werner, Philadelphia, PA (US); Steven Reynolds, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 520 days.

(21) Appl. No.: 12/972,133

(22) Filed: Dec. 17, 2010

(65) Prior Publication Data

US 2011/0264912 A1    Oct. 27, 2011

Related U.S. Application Data

(60) Provisional application No. 61/327,489, filed on Apr. 23, 2010.

(51) Int. Cl.
*G06F 7/04*    (2006.01)

(52) U.S. Cl.
USPC ............................................. 726/30

(58) Field of Classification Search
USPC ....................................... 726/26–30
See application file for complete search history.

(56) References Cited

U.S. PATENT DOCUMENTS

| 7,653,689 B1 * | 1/2010 | Champagne et al. ......... 709/206 |
| 2007/0112676 A1 * | 5/2007 | Kontio et al. .................. 705/50 |
| 2008/0010653 A1 * | 1/2008 | Ollikainen et al. ............. 725/25 |

\* cited by examiner

*Primary Examiner* — Anthony Brown
(74) *Attorney, Agent, or Firm* — Banner & Witcoff, Ltd.

(57) ABSTRACT

A device and method for forming a portable network environment outside a managed network environment for sharing content is provided. A portable network device enables authorized consumption of content outside a managed environment. The portable network device may have an internal rechargeable battery and support wireless protocols such as Wi-Fi. The portable network device may act as a Wi-Fi base station allowing access to authorized Wi-Fi clients via a mesh network.

19 Claims, 5 Drawing Sheets

MANAGED SERVICES ENVIRONMENT PORTABILITY

This application claims the benefit of U.S. Provisional Application No. 61/327,489, filed Apr. 23, 2010, the disclosure of which is herein incorporated by reference in its entirety.

TECHNICAL FIELD

Aspects of the disclosure relate to providing a portable device that allows authorized consumption of content outside a managed environment. More specifically, aspects of the disclosure relate to methods and systems for transmitting and receiving authorized content to other authorized users outside the managed environment on a personalized network.

BACKGROUND

Modern network environments generally have a network device at an end user's location to allow proper reception and transmission of information. For example, in cable communications network environments, end users generally utilize a set top box or modem to receive and transmit information from cable providers. Typically, the data transmitted from the cable provider's network to an end user comprises audio, video, and audio visual content. Such content may be delivered using various security mechanisms such as legacy conditional access systems (CAS) and digital rights media (DRM). These security mechanisms attempt to ensure that only authorized users utilize the delivered content.

However, the content delivered to these end users is limited to use in and around the end user's location. For instance, media received by a set top box in a user's home may be displayed on a television set in direct communication with a set top box. Alternatively, the media may be stored on a personal computer which has been commutatively connected to the set top box for later viewing.

Current networked devices do not enable a user to share authorized media with other users easily away from the end user's location. This is a substantial drawback as users wish to share particular media content and files with other friends and family members. Media content and files which a user may wish to share include pictures, web pages, videos, audio files, and other audio visual content.

Thus, systems and methods that provide for a portable device which enables authorized transmission and reception of media content outside of a managed network to share with other different computing devices would be beneficial to the art.

BRIEF SUMMARY

The following presents a simplified summary of the disclosure in order to provide a basic understanding of some aspects. It is not intended to identify key or critical elements or to delineate the scope of the invention. The following summary merely presents some concepts of the disclosure in a simplified form as a prelude to the more detailed description provided below.

In an illustrative aspect of the disclosure, a portable network device enables authorized consumption of content outside a managed environment. The portable network device may have an internal rechargeable battery and support wireless protocols such as Wi-Fi. The portable network device may act as a Wi-Fi base station allowing access to authorized Wi-Fi clients.

In another illustrative embodiment, the portable network device may maintain several SSID channels that may be managed independently. In another embodiment, the portable network device may support a number of wireless transceiver profiles to extend battery life by using only the power necessary to transmit data realizably.

In another aspect of the disclosure, authorized content may be extended to other devices outside the managed environment. A meshed network may be created outside the managed environment where any number of devices may be part of the temporary network community. While meshed the portable network device may manage battery life through execution of data transmission and reception.

Other embodiments can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other illustrative embodiments are disclosed and claimed herein as well.

The details of these and other embodiments are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
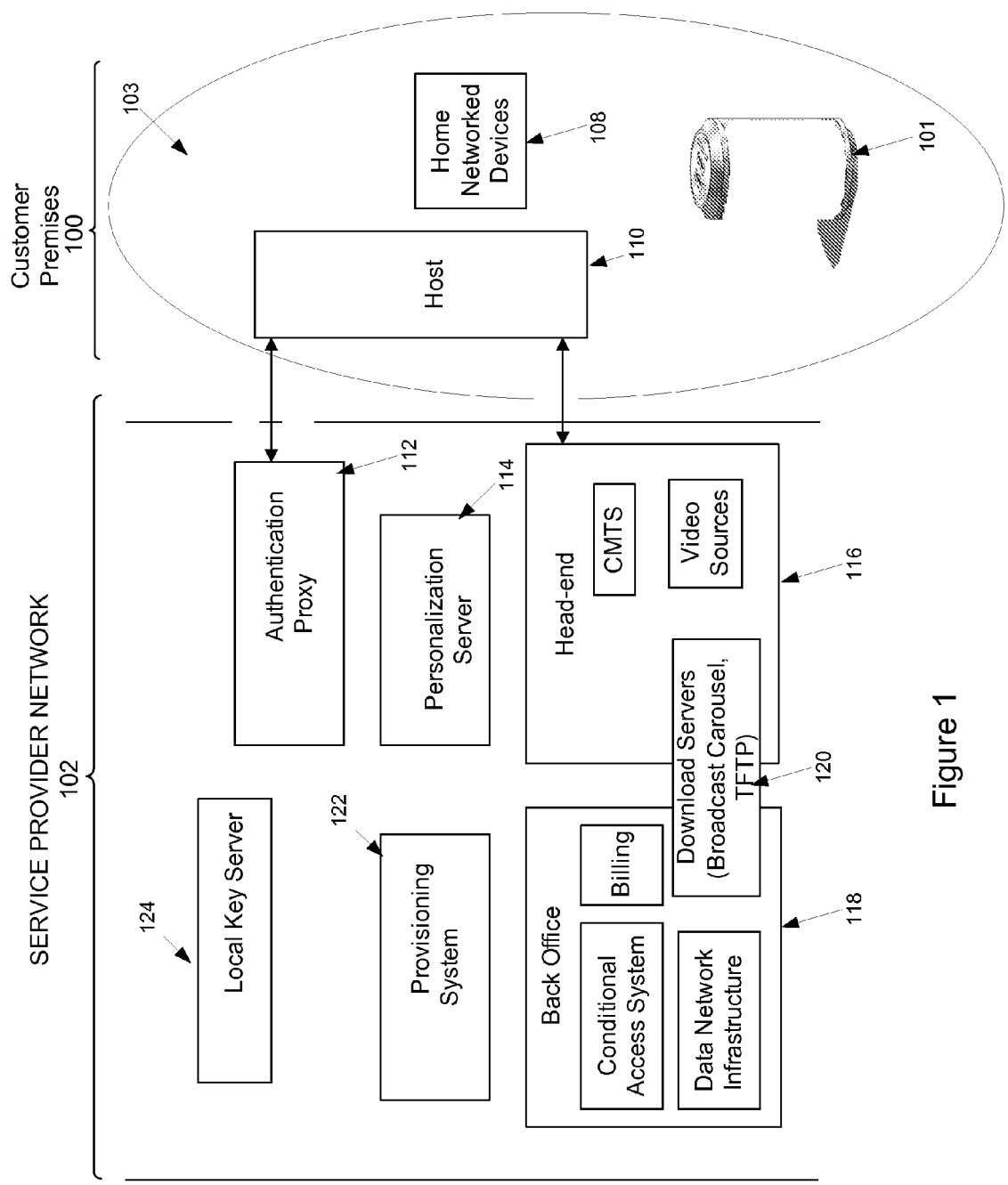
FIG. 1 illustrates a system that may be used to control use of content in a networked environment in accordance with various aspects of the disclosure.

FIG. 1 illustrates a system that may be used to provide authorized media content to compliant premises equipment such as for example a set top box or set top device in accordance with an illustrative embodiment of the disclosure. FIG. 1 is illustrative of one type of architecture that may be used in accordance with various aspects of the disclosure. Those skilled in the art will realize that other architectures may be used with various embodiments of the disclosure.

In FIG. 1, customer premises 100 may include numerous home networked devices 108. Home networked devices 108 may include televisions, DVD players, personal computers, home servers, gaming machines, phones, and a host of other portable media players. Additionally, customer premises 100 may also include portable network device 101 which may enable authorized consumption of content outside managed environment 103.

Furthermore, in an aspect of the disclosure, customer premises 100 may also include a Host device 110 which may be in the form of a set top box or set top device. The host device 110 may communicate to a service provider network 102. The service provider network 102 may include an authentication proxy 112, a personalization server 114, a head-end 116, a back office 118, a provisioning system 122, and a local key server 124. In an illustrative embodiment of the disclosure, download servers 120 may interlink the head-end 116 with the back office 118.

In another illustrative embodiment of the disclosure, the primary point for communication for Host device 110 may be authentication proxy 112. In an additional illustrative embodiment, head-end 116 may also directly communicate with Host device 110 to provide content material. Host device 110 may communicate with home networked devices 108 and portable network device 101 through a wireless or wired network interface. Host device 110 may enable and authorize portable network device 101 to share received and stored authorized media content outside managed environment 103.

Figure 2:
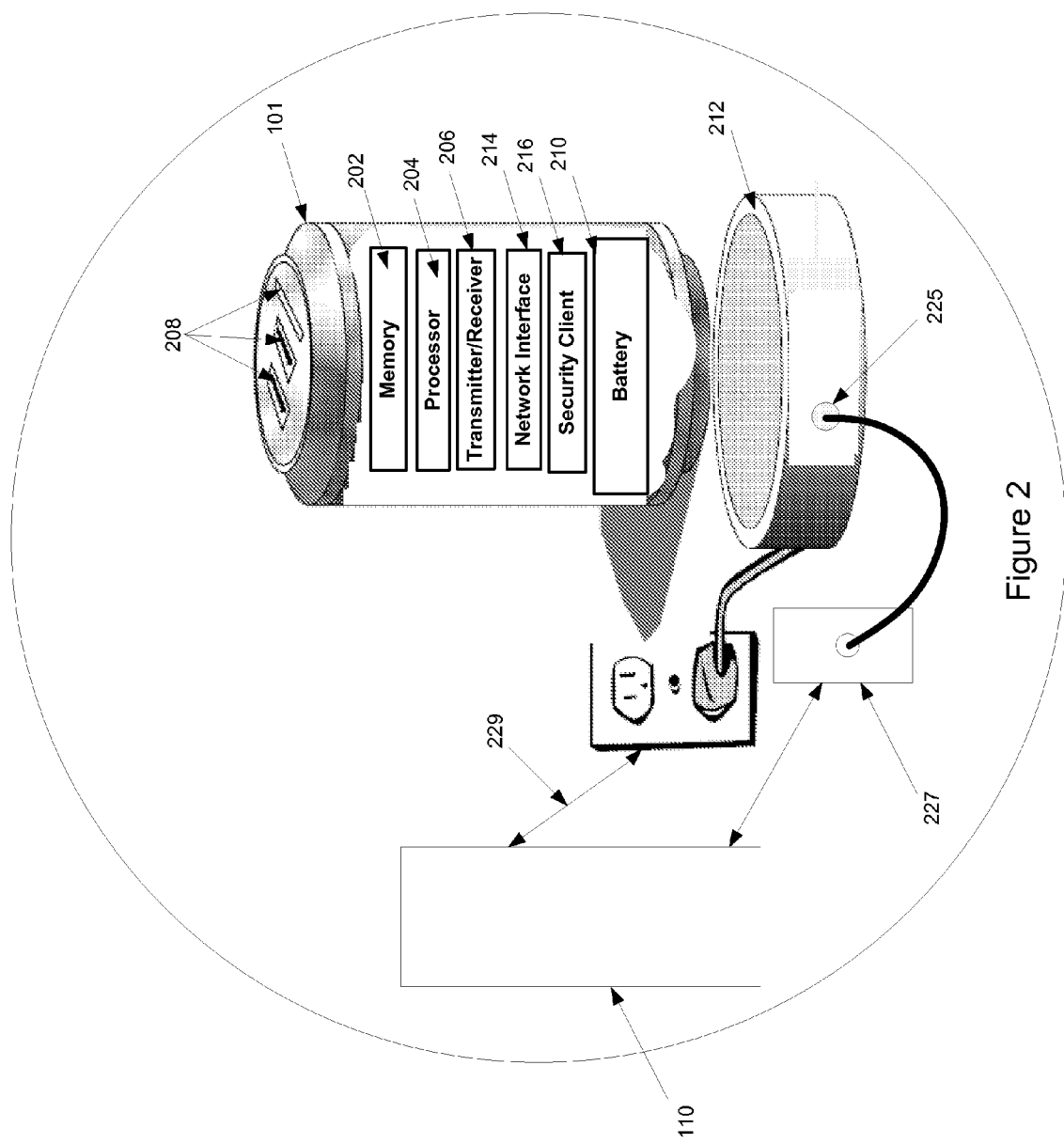
FIG. 2 illustrates a portable network device in accordance with various aspects of the disclosure.

FIG. 2 illustrates portable network device 101 in accordance with an aspect of the disclosure. In FIG. 2, portable network device 101 may include memory 202 which may be read-only memory, random access memory, or combination of read-only and random access memory. Furthermore, portable network device 101 may also include flash memory (not shown). Portable network device 101 may also include a processor 204 to execute computer-executable instructions which may be stored in memory 202. Processor 204 may handle all routine processing functions for the portable network device 101. This processor may also administer security functions.

In an aspect of the disclosure, portable network device 101 may also include a transmitter/receiver 206. The transmitter/receiver 206 may for example act as an 802.11 and/or a WiMax transmitter/receiver. In another aspect of the disclosure, portable network device 101 may also include card readers 208 to read content stored on physical devices, such as smart cards, flash cards, USB drives and/or other memory devices. Portable network device 101 may also include a network interface card 214 and a security client 216.

In an aspect of the disclosure, portable network device 101 may include a rechargeable battery 210. The rechargeable battery 210 may be recharged using an inductive charging coaster 212. In an embodiment, portable network device 101 may be placed in a charging stand. In another aspect of the disclosure, the charging stand may be connected to the managed network through, for example, BPL 229, broadband over power lines, or a coaxial, Ethernet or wireless connection. In addition, charging coaster or stand 212 may be include an "F connector" 225 for connection to host device 110. A receiving "F connector" 227 may also be utilized for intermediate connection to host device 110.

In an embodiment, portable network device 101 may be used when placed in the charging stand. In other embodiments, the rechargeable battery 210 may also be charged with a universal charger or have solar panels installed on the outside of portable network device 101 for constant trickle charging of the rechargeable battery 210 in the presence of a light source.

In an aspect of the disclosure, portable network device 101 may have a similar form factor to that of a soda can. In an embodiment, such a form factor may allow portable network device 101 to be easily transportable in objects having a cup holder such as automobile. Also, such a form factor is easily transportable in a backpack or other type carrying case or even clipped to a belt. The skin of the portable network device 101 may be customizable to a user's preference or may be used to advertise products of a manufacturer. Those skilled in the art will realize that the form factor of the portable network device 101 may take numerous different shapes and that the soda can embodiment discussed below and used in the drawings is merely exemplary and not limiting. In an embodiment of the disclosure, the portable network device 101 may comprise a media device such as a portable media player or a cellular telephone and include an inductively rechargeable battery.

Figure 3:
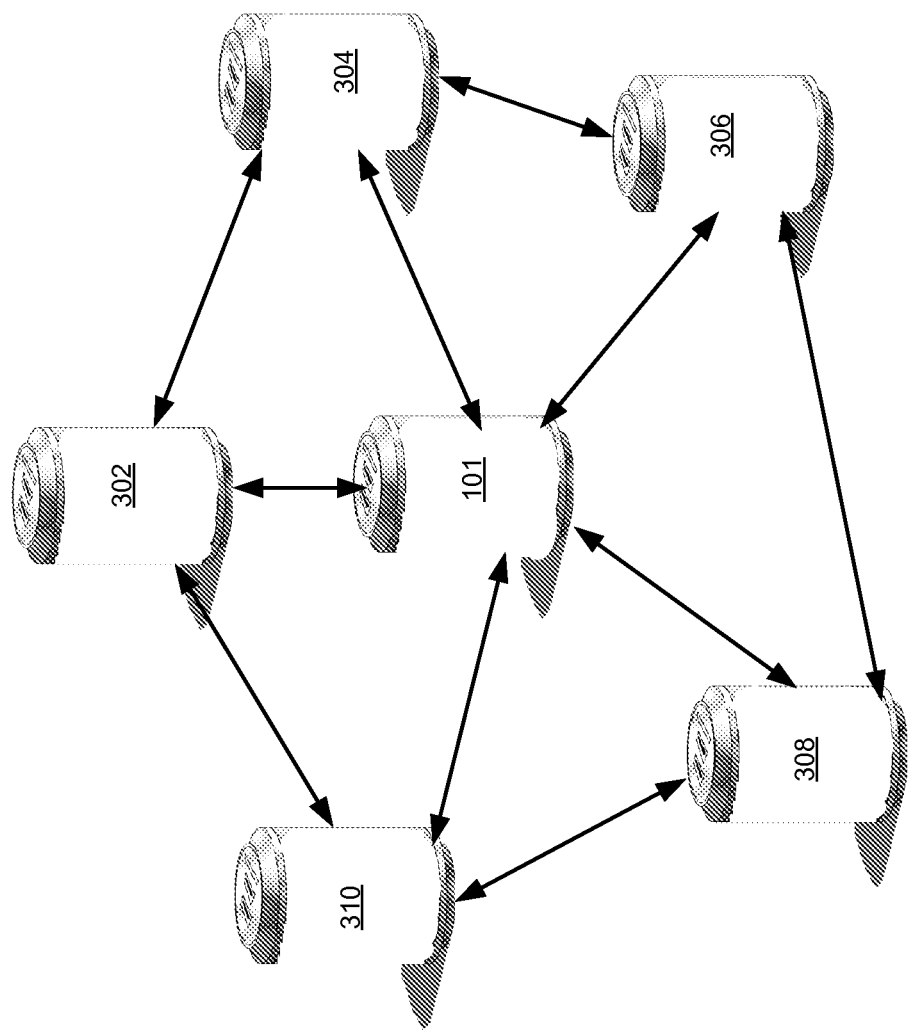
FIG. 3 illustrates a network of portable devices in communication with each other in accordance with various aspects of the disclosure.

FIG. 3 illustrates a network including portable network device 101 in communication with other portable network devices 302-310. In an aspect of the disclosure, portable network device 101 may act as a Wi-Fi base station allowing other authorized devices to access stored or forwarded content. In an embodiment, network device 101 and devices 302-310 may discover one another and create a dynamic mesh community environment. In an aspect of the disclosure, once the devices have discovered each other they may determine if each device is an authorized device. Content may be transferred to other authorized devices along with associated usage rights of the content as a file or streamed to client devices allowing consumption of media real-time on inexpensive display or audio devices. In another aspect of the disclosure, devices 302-310 may connect to each other upon discovery of each other.

In an aspect of the disclosure, portable network device 101 may allow a group of media devices to share information such as contact information for the connected users. For example, users may receive information regarding other users currently connected to the portable network. Such information may include personal photos, live video, clips with commentary, and/or social website information. In an embodiment, portable network device 101 may only share information enabled to be shared by each connected and authorized media device.

In an aspect of the disclosure, portable network device 101 and devices 302-310 may provide different portals to linked devices. The portals may be public or personal web pages and may contain information relating to device configuration choices, device status information, or personal information authorized to be shared.

In another aspect of the disclosure, other wireless links in addition to Wi-Fi may be used for connectivity to other networks such as the Internet. These links could be wireless data links such as 3G/4G/WiMax, or future wireless standards. In an embodiment of the disclosure, use of a modular transceiver component may allow software enhancements or may be upgraded by replacement when support of other future standards is desired.

In yet another aspect of the disclosure, numerous wireless transceiver profiles may be supported so that battery life may be extended by using profiles that reduce overall power consumption.

In an aspect of the disclosure, portable network device 101 may utilize two SSIDs (Service Set Identifiers), one a public facing portal and one a secure/private identifier. Portable network device 101 may support multiple connection profiles, such as offering limited bandwidth connections to devices using the public SSID, and larger bandwidth connections to devices that connect using the private SSID.

In an aspect of the disclosure, other devices may be able to connect to portable network device 101 and share content. Such content may include contact information, GPS data, advertisements, personal web page content that is associated with the owner of the portable network device, pictures, videos, etc. . . . Those skilled in the art will realize that numerous forms of information may be shared between connected devices as the portable networked device 101 acts as a portable hot spot to interconnect devices.

In an aspect of the disclosure, portable network device 101 may control the range of its transmission in order to prolong battery life. For instance, in an embodiment of the disclosure, portable network device 101 may set its wireless network transmitter to cover a standard room size so that just devices with that area (or bubble) of coverage may be able to detect and connect with portable network device 101 and share authorized information. In another embodiment of the disclosure, portable network device 101 may set its wireless transmitter to only provide a bubble large enough to connect other personal devices that a user may also have in their immediate possession such as cellular phone or digital music player.

In another aspect of the disclosure, a WiMax transmitter may be managed so that battery life may be prolonged. In an embodiment, the output of the WiMax transmitter may be adjusted based on proximity of other meshed devices. In another embodiment, each of the meshed devices may be used as links to the WiMax transmitter so that the overall output of the WiMax transmitter may be reduced. In yet another embodiment, a meshed device may drop out of the WiMax network and utilize another device's WiMax connection by becoming a client to that device.

In an embodiment of the disclosure, some of the content stored and available for sharing on portable network device 101 may have been received from host device 110 (FIG. 1). Host device 110 may communicate with portable network device 101 through a wireless or wired network interface 214 (FIG. 2). Host device 110 may enable portable network device 101 to share received and stored authorized media content outside of managed environment 103.

In an aspect of the disclosure, content received from host device 110 by portable network device 101 may be in the form of a security package which includes various viewing rights or entitlements associated with the content delivered. For example, a security package may include DVR viewing rights for a movie. In an aspect of the disclosure, content of the security package may be digitally signed by a trusted entity to ensure that usage rights for the content cannot be altered. In another illustrative embodiment, a security package may include secret keys and or control words associated with the content being transported for use by portable network device 101.

In another aspect of the disclosure, the security package may also include content that has been encoded into a different format based on a review of the usage rights included with the content. In an illustrative embodiment, usage rights may indicate the content structure required by an end user device for accessing of the content. In addition, in another illustrative embodiment, the security package may also include a number of copies allowed to be shared, created, and/or a viewing expiration time for the included content.

In an embodiment of the disclosure, the security package may be generated with a unique content key or keys. In an illustrative embodiment, the security package may be cryptographically bound to the content by hashing a globally unique Content ID to some additional unique data. Those skilled in the art will realize that different hashing methods may be used to secure the content. In addition, the information used for hashing the content may be transported in the created security package. In an illustrative embodiment the generated security package may be transmitted to portable network device 101 or other destination for viewing or accessing of the received content. In another embodiment, an encryption key may be used such that the content contains the encryption key. In an alternative embodiment, the encryption key may be received through other delivery methods which may only decrypt or validate the signature for a single contents rights usage file that is associated to one piece of content.

In an aspect of the disclosure, a security client 216 (FIG. 2) located in portable network device 101 may handle key management for decrypting the received content. The decrypted content may include usage rights for the delivered content. The usage rights may include rights to distribute the content to other personal portable media devices for viewing. In an aspect of the disclosure, the decrypted usage rights may be translated and placed into memory for later viewing or transmission to other authorized portable networked devices and/or other media devices.

Figure 4:
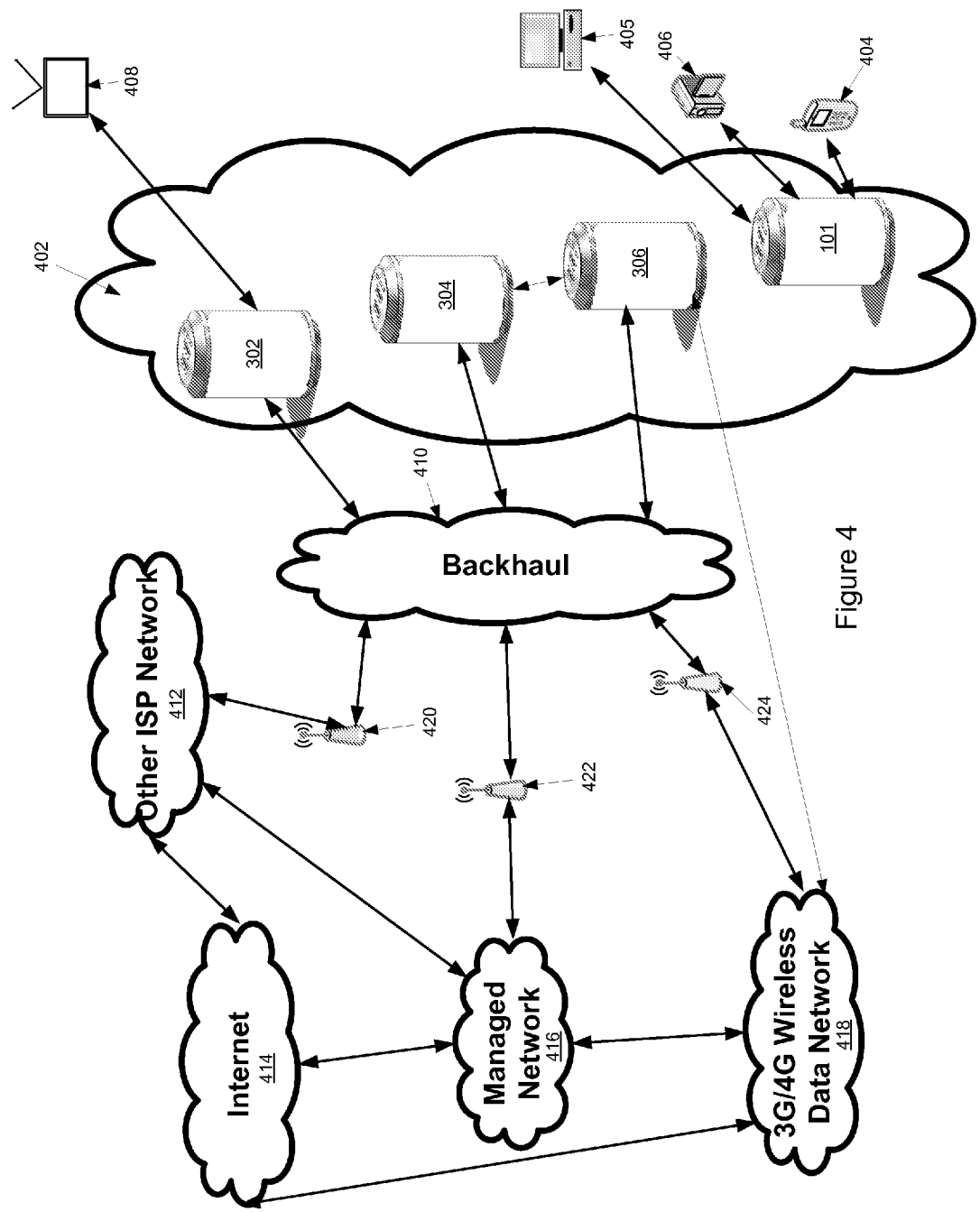
FIG. 4 illustrates an extended managed network service environment in accordance with various aspects of the disclosure.

FIG. 4 illustrates an extended managed service environment in accordance with an aspect of the disclosure. In FIG. 4, a meshed network 402 may be formed between portable networked devices 101, 302, 304, and 306. As illustrated in FIG. 4, portable network device 101 may be in good mesh coverage and hosting nearby cellular phone 404, computer 405, and video camera 406. Because portable network device 101 is in close proximity to cellular phone 404, computer 405, and video camera 406 and has a good signal strength connection to mesh network 402, portable network device 101 may decrease its range of transmission in order to preserve battery life.

In an embodiment, video camera 406 may share stored video or pictures with portable networked device 101. In addition, portable networked device 101 may also share any received video or pictures from video camera 406 which other authorized and connected portable networked devices such as devices 302-306 and cellular phone 404. Furthermore, computer 405 may also share data with portable network device 101. In an embodiment, the data may also be shared with other authorized and connected portable networked devices such as devices 302-306 and cellular phone 404.

In another aspect of the disclosure, portable network device 302 may be at a distance far from the center of mesh network 402 core and also hosting a digital TV 408 located at a distant location. In this embodiment of the disclosure, portable network device 302 may increase its range of transmission to a maximum in order to improve signal reception.

In an embodiment, digital TV 408 may receive content to be viewed and/or stored from portable network device 302. In addition, portable network device 302 may also receive additional content from other portable networked devices such as portable network devices 101 and 304-306 to be displayed and/or stored by digital TV 408.

In another aspect of the disclosure, portable network devices 304 and 306 may be connected to other networks through backhaul 410. Such networks may include other ISP networks 412, Internet 414, managed network 416, and or a 3G/4G wireless data network 418. In an embodiment of the disclosure, connections to these networks may be made through access points 420-424. In an embodiment, portable network devices 304 and 306 may also communicate to other networks or to each other through wired connections such as MoCA, USB, or Ethernet.

In an aspect of the disclosure, portable network device 304 may include a preferred/primary connection to backhaul 410. In an embodiment, portable network device 304 may hot swap the preferred/primary connection via portable network device 304 to backhaul 410 to portable network device 306 if a low battery condition or other shutdown condition develops so that data is not lost or corrupted.

Figure 5:
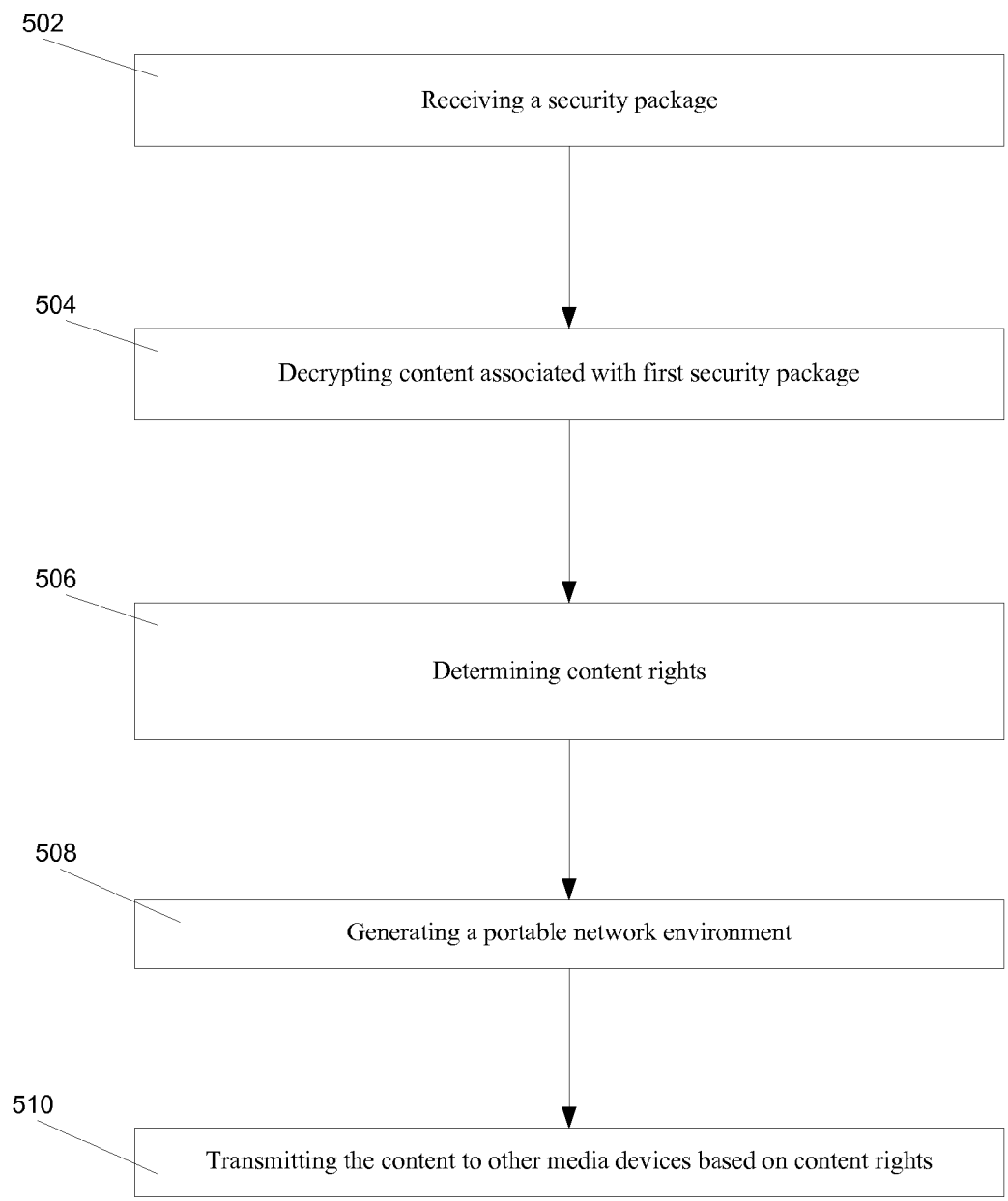
FIG. 5 illustrates a method of forming a portable network in accordance with an aspect of the disclosure.

FIG. 5 illustrates a method of forming a portable network environment outside a managed network for sharing content in accordance with an aspect of the disclosure. In FIG. 5, at step 502, a security package may be received by a portable network device 101. The security package may include encrypted content. The security package may be transmitted from a host device such as set top box.

Next, in step 504, the encrypted content may be decrypted by the portable network device. In step 506, content rights for the decrypted content may be determined. Next, in step 508, a connection outside the managed network environment may be established to from a portable network environment. The portable network environment may comprise a meshed network located outside the managed network environment. In step 510, the decrypted content may be transmitted and shared with other media devices based on the determined content rights.

In all cases, any content decrypted by the portable media device may be re-encrypted (possibly with a second key or crypto method) for secure transmission to other devices. This may include some security specific to a mesh network, unique to the receiving devices or even session specific.

While the illustrative embodiments have been discussed in broad terms of a cable or fiber optic communications networking environment, the invention, however, may be configured for other networking environments including various existing and future telecommunications environments.

We claim:

1. A method comprising:
   receiving, by a cylindrically shaped device, a security package through a managed network environment, the security package comprising encrypted content;
   decrypting the encrypted content to produce decrypted content;
   determining content rights for the decrypted content;
   establishing a connection with a first media device outside the managed network environment to form a portable network environment, the portable network environment comprising a mesh network;
   transmitting the decrypted content to the first media device based on the determined content rights; and
   establishing a connection with a second media device and transmitting the decrypted content to the second media device through the mesh network based on the determined content rights.

2. The method of claim 1, wherein establishing a connection with the first media device comprises discovering a public SSID channel.

3. The method of claim 1, wherein establishing a connection with the first media device comprises discovering a private SSID channel.

4. The method of claim 1, wherein the managed network environment comprises a household.

5. A portable network device comprising:
   a memory for storing computer readable instructions; and
   a processor connected to the memory and configured to:
   receive a security package in a managed network environment, the security package including encrypted content;
   decrypt the encrypted content to produce decrypted content;
   determine content rights for the decrypted content;
   generate a connection with a media device outside the managed network environment to form a portable network environment, the portable network environment comprising a mesh network; and
   transmit the decrypted content to the media device based on the determined content rights; and
   a housing that houses the memory, and the processor wherein the housing is cylindrically shaped such that the portable network device is configured to be placed in a cup holder.

6. The portable network device of claim 5, wherein the media device comprises a second portable network device.

7. The portable network device of claim 5, wherein the media device comprises a cellular telephone.

8. The portable network device of claim 5, wherein the media device comprises a portable media player.

9. The portable network device of claim 5, wherein the content rights correspond to copy control information.

10. The portable network device of claim 5, wherein the cylindrically shaped housing comprises a soda can.

11. The portable network device of claim 5, wherein the housing is configured to comprise a battery compartment.

12. The portable network device of claim 5, wherein managed network environment comprises a household.

13. The portable network device of claim 5, wherein the portable network environment comprises a mesh network.

14. The portable network device of claim 13, the processor further configured to establish a connection with a second media device and to transmit the content to the second media device through the mesh network based on the determined content rights.

15. The portable network device of claim 5 further comprising a charging stand, the charging stand configured to connect to the managed network.

16. The portable network device of claim 5 further including at least one card reader.

17. A non-transitory computer-readable medium comprising computer-executable instructions that when executed cause a device to perform steps comprising:
   receiving by a cylindrically shaped device, a security package through a managed network environment, the security package comprising encrypted content;
   decrypting the encrypted content to produce decrypted content;
   determining content rights for the decrypted content;
   establishing a connection with a media device outside the managed network environment to form a portable network environment, the portable network environment comprising a mesh network;
   transmitting the decrypted content to the media device based on the determined content rights; and
   establishing a connection with a second media device and transmitting the decrypted content to the second media device through the mesh network based on the determined content rights.

18. The method of claim 1, wherein managed network environment comprises a plurality of networked devices located at a user premises.

19. The portable network device of claim 11, wherein the battery compartment comprises an inductively rechargeable battery.

* * * * *